United States Patent

Bonsan

[11] Patent Number: 5,975,312
[45] Date of Patent: Nov. 2, 1999

[54] FLUID FILTER

[75] Inventor: Robert W. Bonsan, Millet, Canada

[73] Assignee: Black, Sivalls & Bryson, Limited (Canada), Canada

[21] Appl. No.: 08/921,867

[22] Filed: Aug. 28, 1997

[51] Int. Cl.⁶ .......................... B01D 27/08; B01D 35/00
[52] U.S. Cl. .................. 210/439; 210/440; 210/443; 210/445; 210/450; 210/451; 210/453
[58] Field of Search ..................... 210/439, 440, 210/443, 444, 453, 450, 451, 445, 321.75, 321.84, 483

[56] References Cited

U.S. PATENT DOCUMENTS

| 2,809,754 | 10/1957 | Pudlo | 210/443 |
| 2,997,178 | 8/1961 | Lorimer | 210/266 |
| 3,028,012 | 4/1962 | Billner | 210/499 |
| 3,224,590 | 12/1965 | Nord et al. | 210/438 |
| 3,443,693 | 5/1969 | Biermann | 210/123 |
| 3,485,376 | 12/1969 | Peterson et al. | 210/331 |
| 3,502,176 | 3/1970 | Terry | 210/440 |
| 3,880,757 | 4/1975 | Thomason | 210/167 |
| 4,257,890 | 3/1981 | Hurner | 210/112 |
| 4,446,017 | 5/1984 | Oberg | 210/420 |
| 5,053,129 | 10/1991 | Kitson | 210/232 |
| 5,145,033 | 9/1992 | Bedi et al. | 184/1.5 |
| 5,234,592 | 8/1993 | Schneider | 210/440 |
| 5,382,360 | 1/1995 | Vosper | 210/239 |
| 5,399,265 | 3/1995 | Nehls | 210/490 |
| 5,443,723 | 8/1995 | Stankowski et al. | 210/321.75 |
| 5,584,987 | 12/1996 | Mules | 210/130 |
| 5,620,599 | 4/1997 | Hopkins | 210/420 |

FOREIGN PATENT DOCUMENTS

| 891031 | 1/1972 | Canada | 182/29 |
| 1133834 | 10/1982 | Canada | 182/76 |
| 1190155 | 7/1985 | Canada | 182/105 |

OTHER PUBLICATIONS

Oberg MS, Inc., date unknown, "UFO Reusable Filters—Filtration Systems For All Size Engines".

*Primary Examiner*—David A. Reifsnyder
*Attorney, Agent, or Firm*—Finnegan, Henderson, Farabow, Garrett & Dunner, L.L.P.

[57] ABSTRACT

A full-flow filter is disclosed and which comprises a screen or element housed between two body halves. The construction of the filter is such that fluid to be filtered enters and exits the filter body from the same side thereof.

12 Claims, 8 Drawing Sheets

FLUID FILTER

FLUID FILTER

This invention relates to filters and in particular, to a filter assembly incorporating a full-flow system of the type utilizing a filter element sandwiched between two halves of a filter body.

BACKGROUND OF THE INVENTION

Fluid filters have been in use for many years and are available in numerous forms. The present invention relates to that type of filter having a removable filter element or screen. These are sometimes referred to as disc filters due to their configuration. One example of a prior art filter may be seen in U.S. Pat. No. 3,485,376, Petersen et al., of Dec. 23, 1969. This patent specification discloses a disc type filter using a plurality of separate sections and separable components therein.

U.S. Pat. No. 3,028,012, Billner, Apr. 3, 1962, illustrates a sandwich type of filter, having fluid inlet and outlets to the filter on opposite sides of the filter body.

U.S. Pat. No. 4,446,017, May 1, 1984, Oberg, illustrates a sandwich type of filter utilizing a removable filter element of wire screen. The filter has upper and lower halves which, together, clamp the filter element therebetween. The path taken by the fluid to the filter interior is such that the fluid enters the filter on one side of the filter body and exits through an outlet opening on the opposite side of the filter body.

Another example of the prior art is shown in Canadian Patent 891,031, Forster, of Jan. 18, 1972. This specification discloses a plate for a filter press in which a slanted interior wall is utilized to facilitate filter cake removable by gravity. An interior gasket is mounted within a groove extending along the slanted wall to mount the filter cloth within the peripheral edges of the filter plate to eliminate wear of the filter cloth.

In the examples of prior art listed above, fluid to the filter enters one side of the filter body and leaves on an opposite side. With such arrangements, removing the filter element for either with a fresh element or for cleaning, and re-installation if it is a reusable element, requires removal of at least one hose from one side of the filter. This disrupts the fluid circuitry and requires expensive hoses and hydraulic hardware. Other disadvantages result from having the fluid entrance on one side of the body and the fluid exit on the other, not the least of which is the difficulty in using fixed piping for a reduction in maintenance and safety risks.

SUMMARY OF THE INVENTION

A filter assembly according to the present invention provides a marked improvement over conventional filter structures by incorporating a removable filter screen housed between two precision machine halves of the filter body. Preferably, the filter screen has perimeter seals permanently molded thereto and, while not absolutely necessary to the function of the filter, a cleanable, reusable, stainless steel filter is preferred.

One of the unique features of the filter according to the invention is that the fluid to be cleaned enters and leaves the filter body from the same side thereof so that hoses and other mechanisms need not be removed in order to change the filter element. One half of the filter body is therefore removable without the need to dismantle the fluid connections to the filter body. With the filter housing having the fluid inlet and outlet connections on the same side thereof, it permits the most efficient assembly of a series of filter units into a manifold system. With all the piping connections on the same side, there is no need for flexible hoses to permit access to the housing for filter cleaning and fixed piping can be used which reduces maintenance and safety risks. The "dirty" side of the filter body is opposite to the connection side. The filter housing can be disassembled from the dirty side without disturbing the manifold connections, if such are utilized. This permits convenient and full access to the dirty side of the filter body or bodies for screen removal, cleaning, if necessary, and replacement.

The filter assembly according to the invention utilizes a centrally located assembly bolt which also functions as an integral flow input nozzle. By directing the dirty fluid into the centre of the filter assembly, and upstream of the filter element, the dispersion of the fluid to be cleaned across the available filter element area is optimized. This helps to maximize the fluid flow-through of the device. Additionally, by using an integral bolt and nozzle, it enables the combination of a simple clamping mechanism for the housing with the central flow input.

The filter according to the invention provides superior filtration of most any type of liquid and may be used in many applications including engine oil, hydraulic oils, fuel, glycol, water, or where safe, dependable filtration is required.

Filters in accordance with the invention are available in various sizes to match flow requirements and, in applications where high flow rates are required, the filter is most adaptable to manifold handling several hundred gallons per minute. Each filter can be isolated by servicing without shutting down the whole unit.

While the body of the filter element can be manufactured from a variety of materials such as carbon steel or stainless steel, we have found that a preferred material is 6061-T6 aluminum.

The filter of the invention is useful as a diagnostic tool as the filter elements can be quickly removed and studied on the spot to determine from the contaminants in the filter element if a major problem is developing in a fluid system in which the filter is forming a part. With respect to the filter elements, stainless steel wire cloth screen has been around since the early 20's in various weaves. While filter screens or elements of the "throwaway" type are useable, it is preferable to use a cleanable, stainless steel screen. One example of a superior screen is one formed of Betamesh 316 stainless steel. A filter element from this material can be cleaned easily and reused many times. The screen is molded in viton rubber which acts as the peripheral seal for mounting the element into the halves of the filter body. Betamesh is similar to a plain Dutch weave but has far superior performance characteristics. A larger portion of solids is retained on the surface of the cloth than with other Dutch weaves. This results in a higher contaminant tolerance and excellent back-flushing properties. Betamesh also has more open area and consequently higher flow rates than other Dutch weaves.

Tests have shown that a filter in accordance with the present invention and utilizing a Betamesh stainless steel screen, has less pressure loss than disposable filters. Accordingly, one may expect higher oil pressure and more lubrication to one's vital components.

According to a broad aspect, the invention relates to a fluid filter comprising housing having front and rear halves with a filter element detachably secured therebetween. A centrally located bolt secures the filter halves and filter element together and a fluid entrance port and internal fluid passageways are provided in the bolt for transmitting fluid to be filtered into the body of the filter upstream of the filter element. A fluid exit port is located downstream of the filter element and on the same side of the filter housing as the fluid entrance port in the centre bolt.

BRIEF DESCRIPTION OF THE DRAWINGS

The invention is illustrated in the accompanying drawings in which.

DETAILED DESCRIPTION OF A PREFERRED EMBODIMENT

Figure 1:
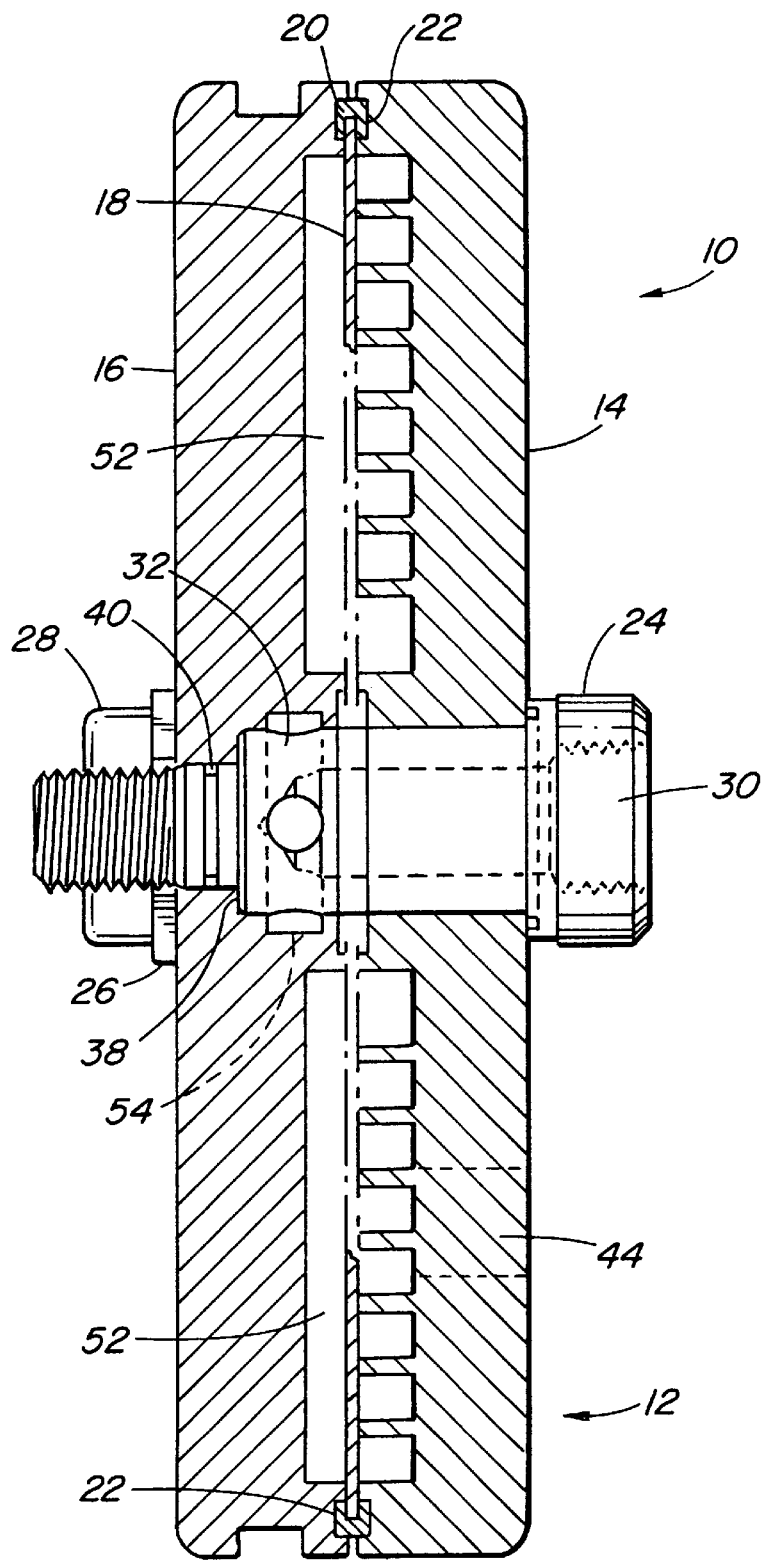
FIG. 1 is a cross-sectional view of a filter assembly according to the assembly.

Referring initially to FIG. 1, a fluid filter according to the invention is illustrated generally at 10 and comprises a housing 12 having two halves, 14 and 16. While the half portions of the housing 12 may be referred to as "top and bottom" or "front and rear", for the purposes of this description, the housing half 14 will be referred to as the front half and the housing half 16 will be referred to as the rear half.

A filter element 18 is mounted between the two halves 14 and 16, the filter element having a peripheral seal 20 (as shown in greater detail in FIGS. 4 and 5) located in peripheral grooves 22 of the housing halves 14 and 16. The filter element 18 is clamped between the two filter halves and these in turn are secured together by means of a centrally located bolt 24 which, in final assembly, is secured by a washer 26 and nut 28.

Figure 2:
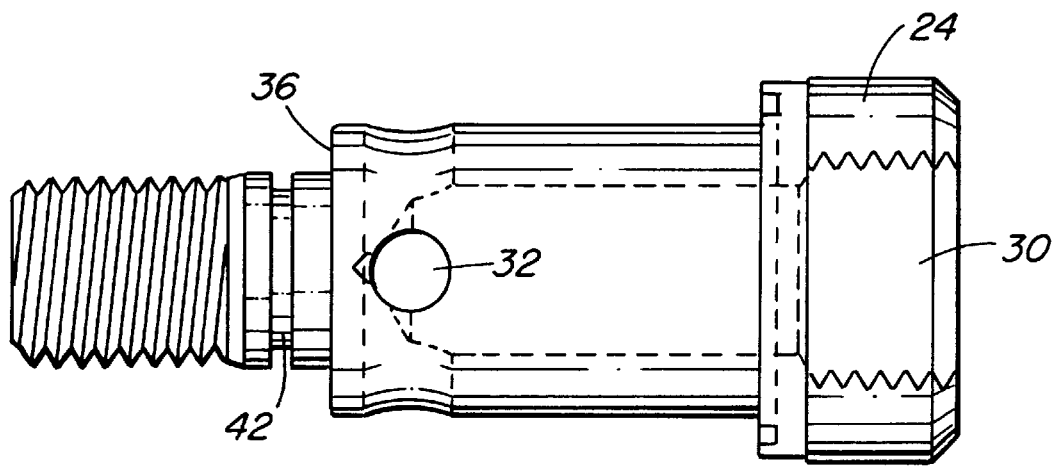
FIG. 2 is an elevation view of the centre securing bolt.
Figure 3:
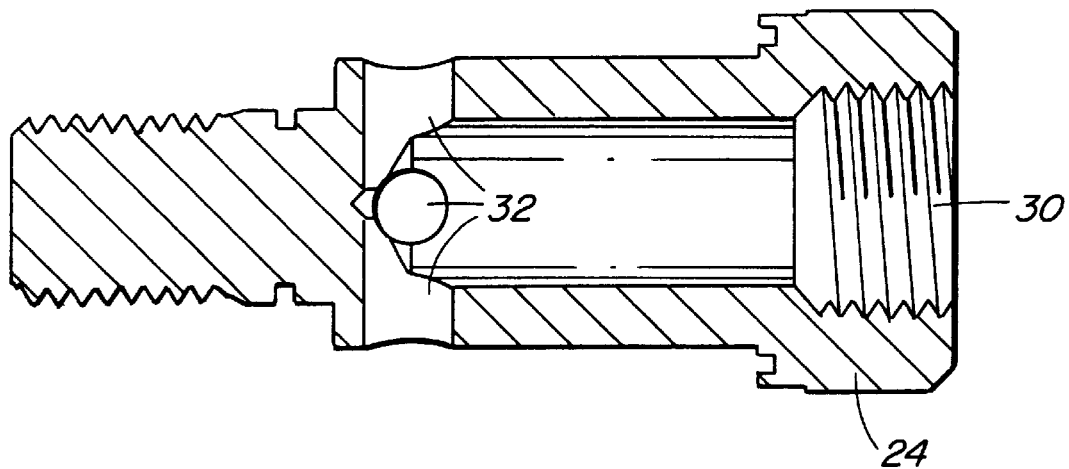
FIG. 3 is a cross-sectional view of the centre bolt in FIG. 2.

As shown in FIGS. 1, 2 and 3, the bolt 24 has a central fluid entrance port 30 which leads to radially extending, transverse fluid passageways 32 for the transmission of fluid to be filtered into the interior of the body of the filter 10, specifically, into the confines of the rear half 16 of the housing and therefore upstream of the filter element 18. The bolt 24 has a shoulder 36 which sits in a socket 38 in the rear half 16 of the filter housing and an O-ring 40 sits in a groove 42 (FIG. 2) to seal that end of the bolt.

Figure 6:
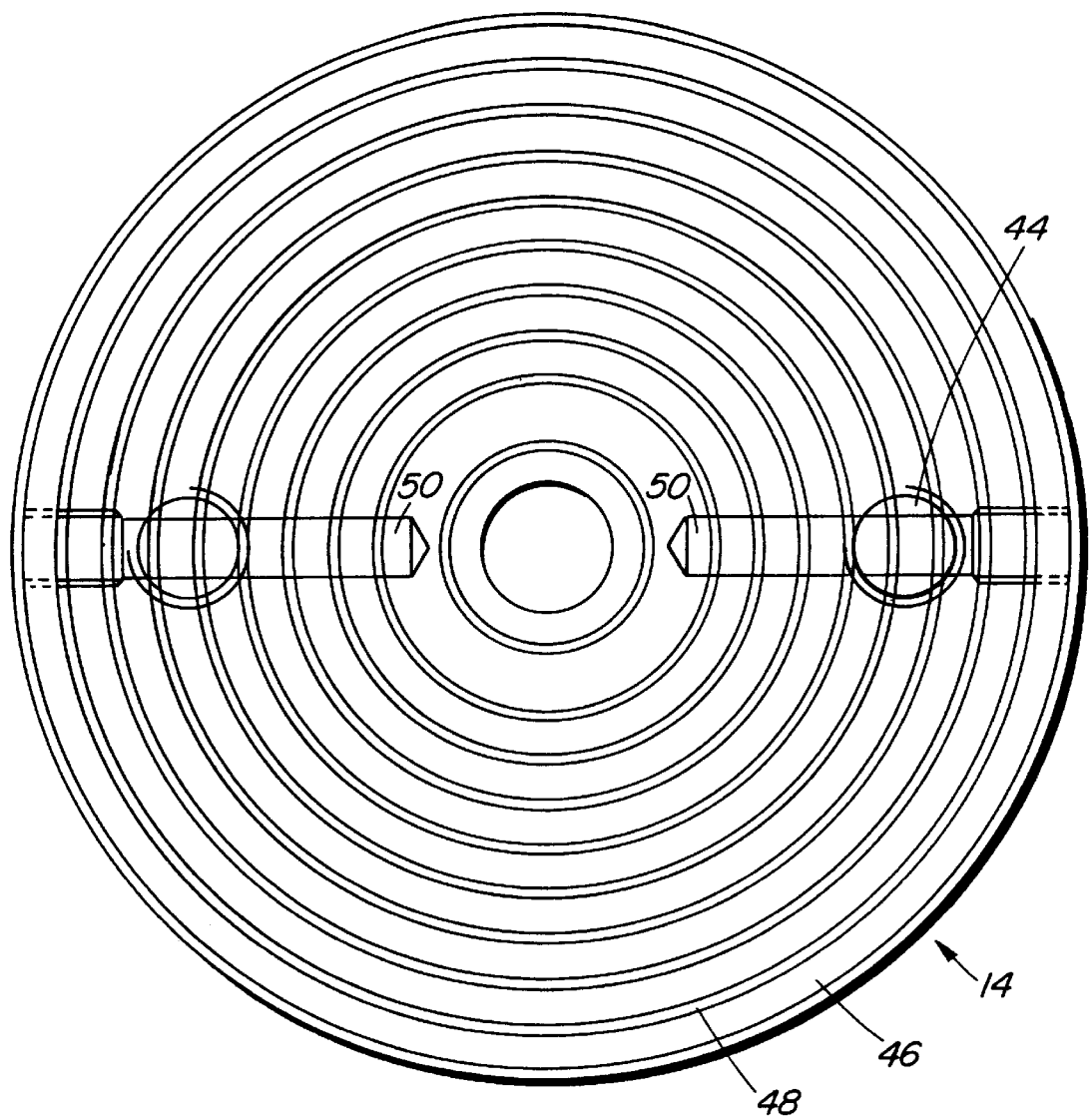
FIG. 6 is an elevation view of one half of the filter body.

As shown in FIGS. 1 and 6, the housing 12 has a fluid exit port 44 in the front half 14 of the housing and therefore on the same side of the housing as the fluid entrance port 30 in the centre bolt 24.

Figure 4:
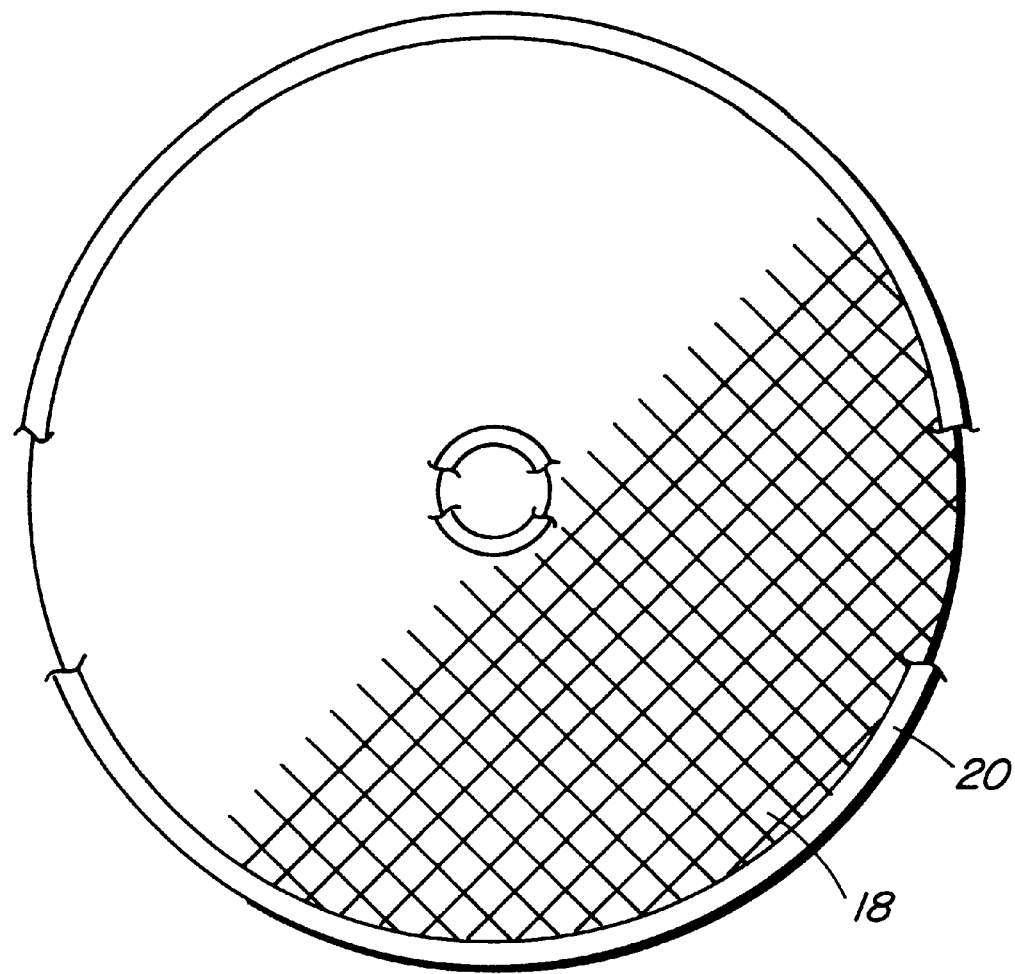
FIG. 4 is an elevation view of a filter element used in the present invention.
Figure 5:
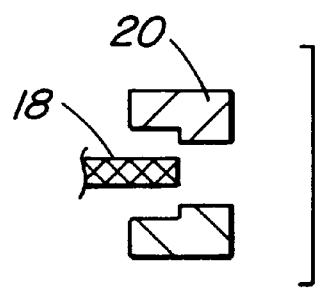
FIG. 5 is a cross-sectional, exploded view of the edge of the filter element illustrated in FIG. 4.

As shown in FIGS. 4 and 5, the filter element comprises a circular screen 18 having its peripheral edge molded in viton rubber which provides the seal 20 that is subsequently encompassed in the grooves 22 of the front and rear housing halves 14, 16 shown in FIG. 1.

Figure 7:
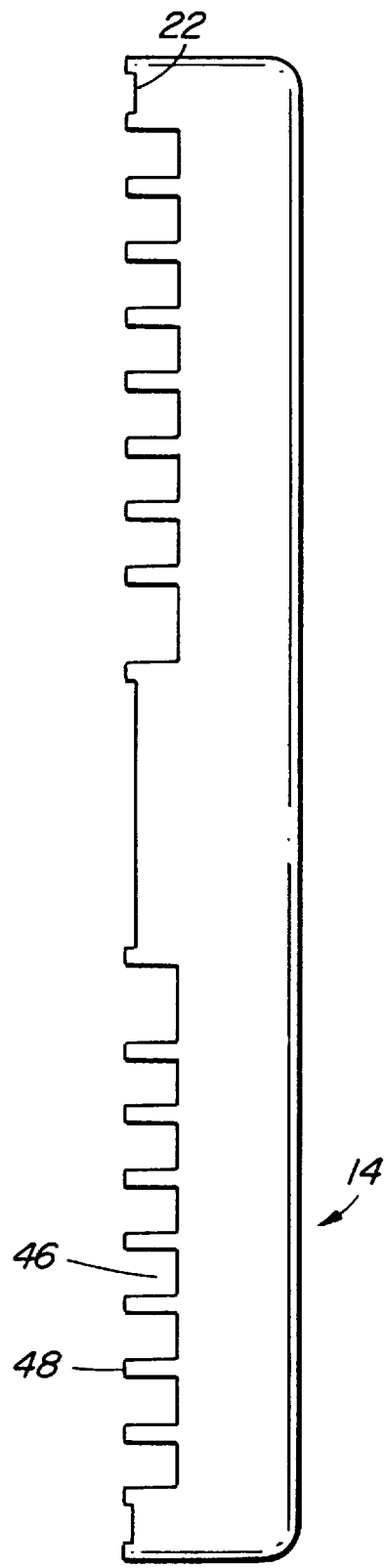
FIG. 7 is a cross-sectional view of the filter half shown in FIG. 6.
Figure 8:
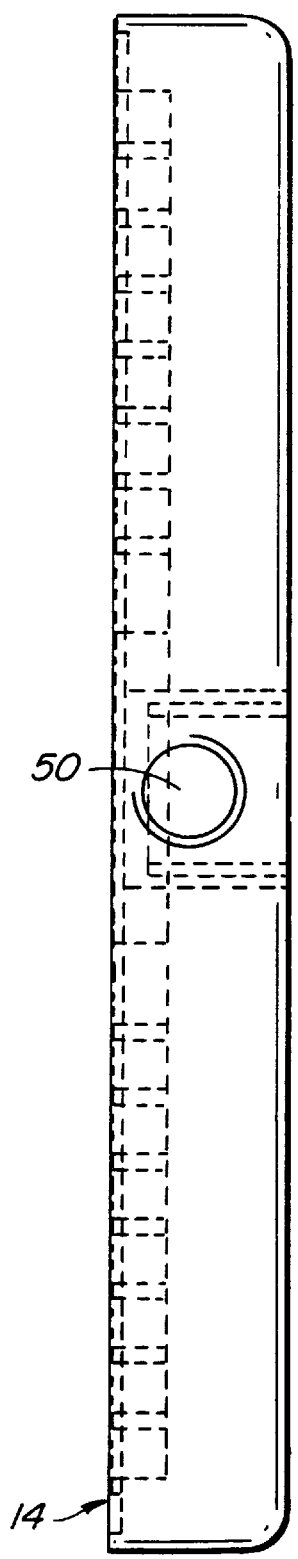
FIG. 8 is an end elevation view of the filter half of FIG. 6.

Referring to FIGS. 6, 7 and 8, the front half 14 of the filter housing 12 has a plurality of concentric grooves 46 with equally spaced ribs 48 adjacent each groove, the ribs serving to support the filter element 18 when the latter is under fluid pressure. Transverse conduits 50 allow passage of the fluid which has passed through the filter element 18 and into the grooves 46 to move on to the exit port 44 and out of the housing 12.

Figure 9:
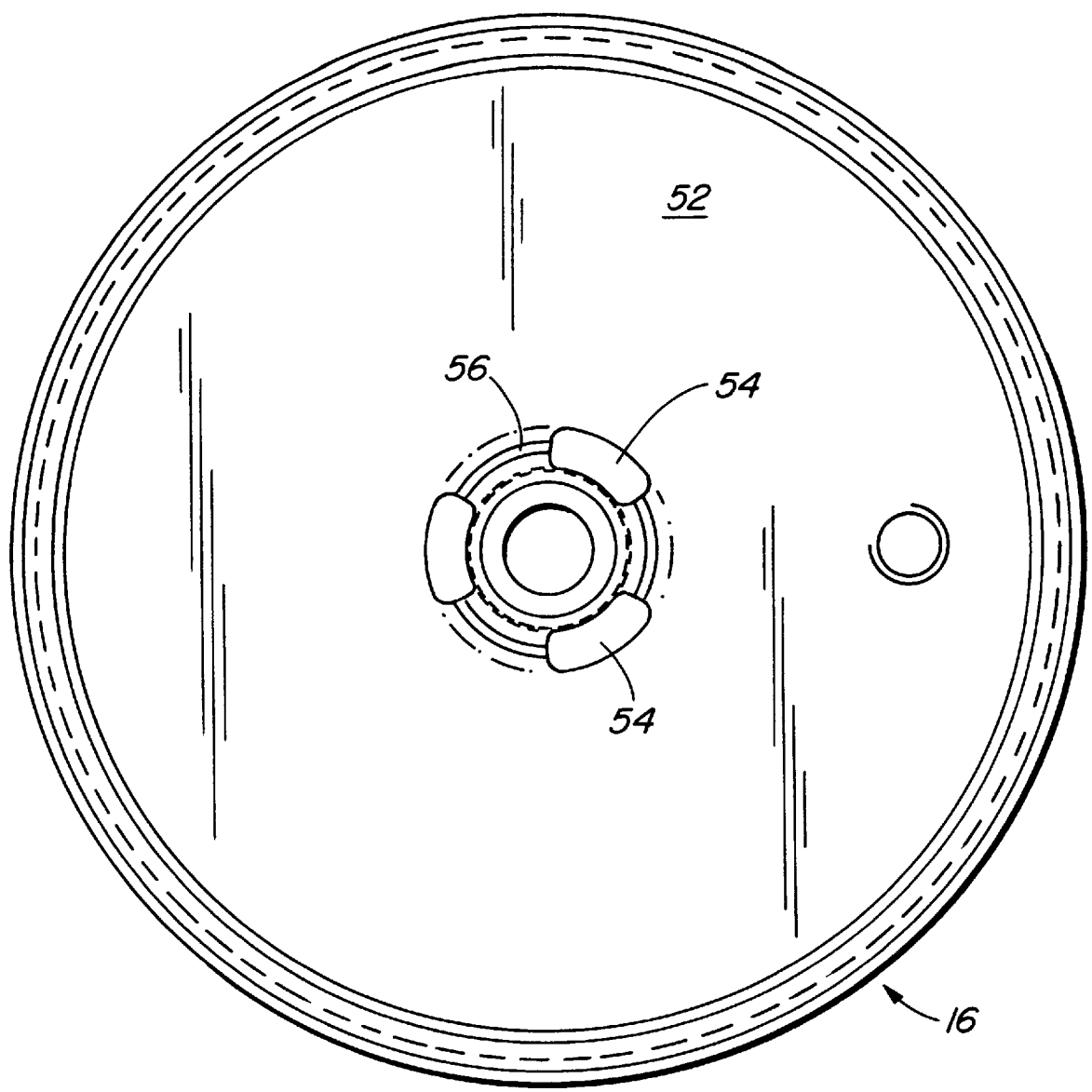
FIG. 9 is an elevation view of the other half of the filter body.
Figure 10:
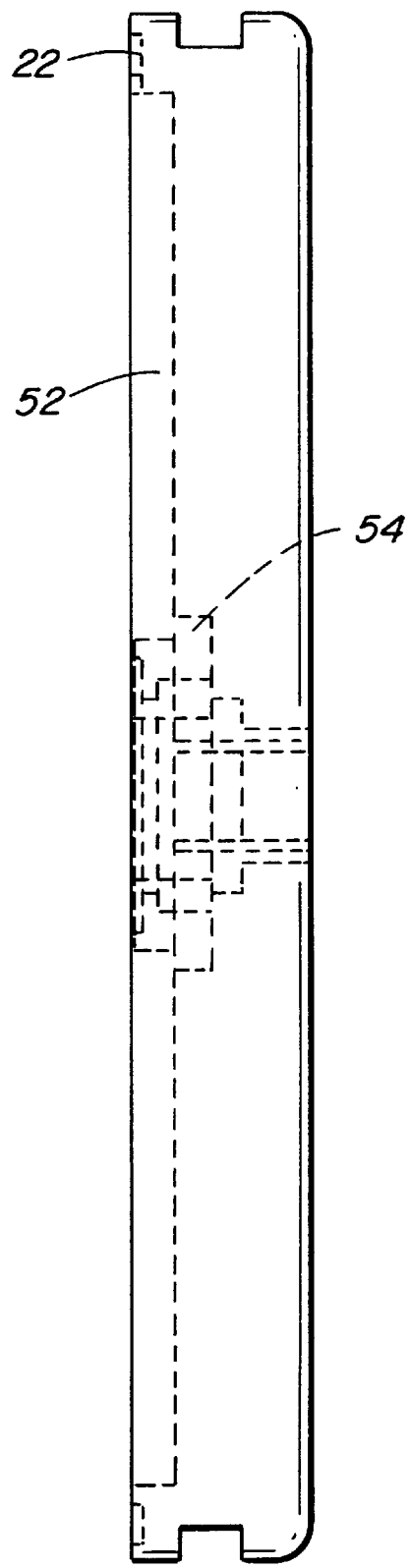
FIG. 10 is a cross-sectional view of the filter half in FIG. 9.

Referring to FIGS. 9 and 10, the rear half 16 has a large, flat-bottomed cavity 52 for receiving the fluid to be cleaned and this fluid flows into the cavity 52 from a plurality of pockets 54, interconnected by a groove 56, the pockets 54 being in communication with the radial ports 32 in the bolt 24 illustrated in FIGS. 2 and 3. It will be appreciated from FIGS. 9 and 10 as well as from FIG. 1, that the flow of fluid commences inwardly into the housing 12 through the inlet port 30 in the bolt 24, outwardly through the ports 32 located in the inner end of the bolt 24 and then into the pockets 54 in the rear housing half 16 and then into the large cavity 52 therein. The fluid then passes through the filter element 18 into the various grooves 46 in the front element 14 of the housing and then out through the outlet port 44 in the front half of the housing.

It will be further appreciated from FIGS. 1, 9 and 10 that the grooves 46 and ribs 48 are located only on the exit half or front half 14 of the housing, the other half having the large cavity 52 which allows unrestricted movement of the fluid to be cleaned over the surface of the filter element 18.

Figure 11:
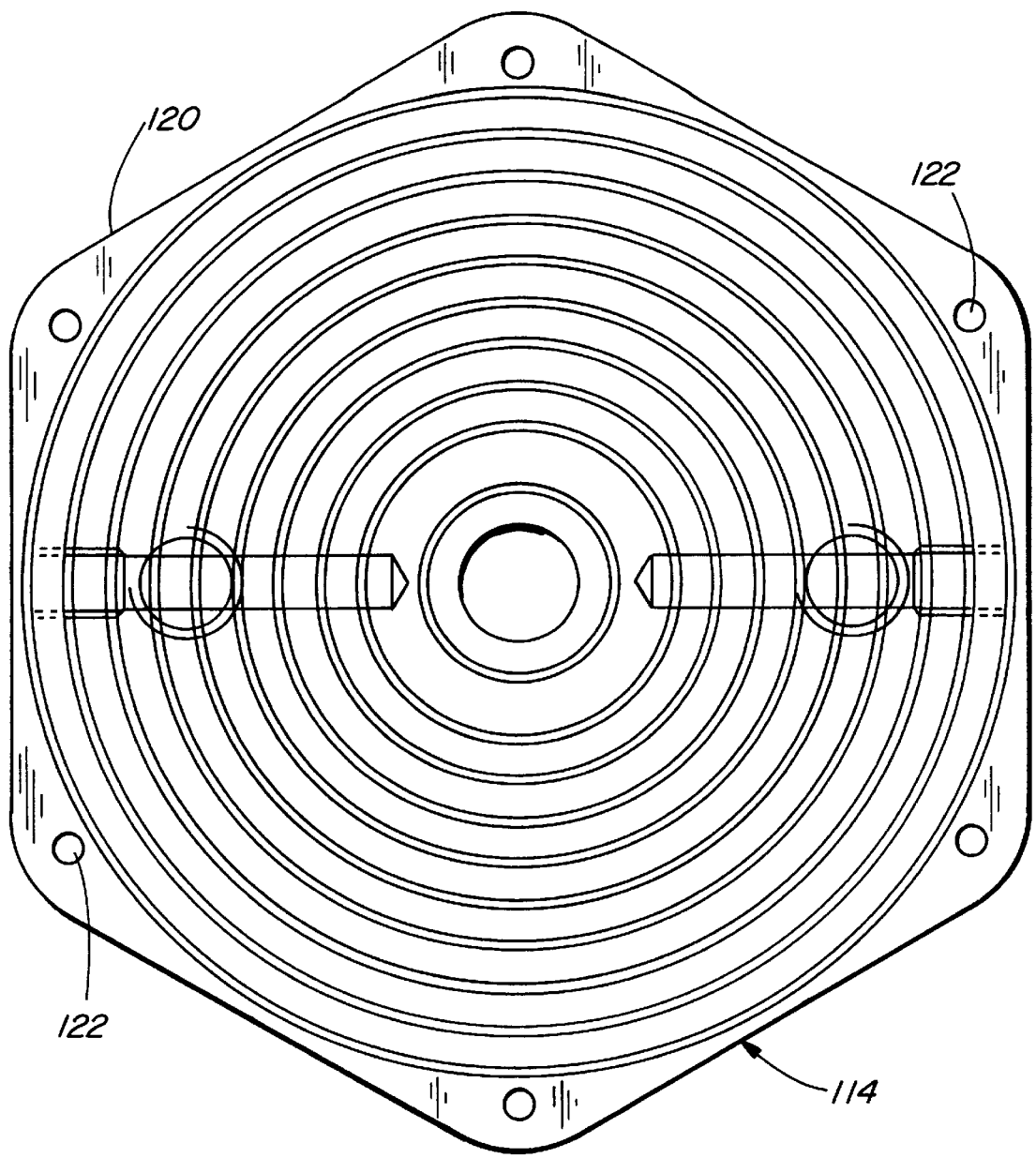
FIG. 11 is a view similar to FIG. 6 but showing a further embodiment of the invention.

FIG. 11 is an elevation view of another embodiment of the front half of the filter body and, while it is basically identical to the embodiment shown in FIG. 6, it is modified to have a different means of clamping the two halves of the filter body or housing together. As shown in FIG. 11, the front half 114 of the housing (as well as the rear part of the housing, not shown) would be provided with a perimeter or annular flange 120 configured to provide a plurality of bolt holes or apertures 122 for the reception of bolts for clamping the two halves of the housing together. In such an arrangement, the central bolt 24 (FIG. 1) would still be used as the fluid inlet for reasons of superior fluid dispersion across the screen but it would not necessarily be used in a clamping mode.

While the invention has been described in connection with specific embodiments thereof and in a specific use, various modifications thereof will occur to those skilled in the art without departing from the spirit and scope of the invention as set forth in the appended claims.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the invention claims.

What is claimed is:

1. A fluid filter comprising:

a housing having front and rear halves with a filter element detachably secured therebetween, the filter element having a perimeter seal and each of said halves having an annular groove for receiving and seating said perimeter seal;

a centrally located bolt securing said filter halves and filter element together;

a fluid entrance port on one side of the housing for transmitting fluid to be filtered to a position upstream of the filter element; and a fluid exit port downstream of the filter element and on the same half of the filter housing as the fluid entrance port.

2. A fluid filter according to claim 1 wherein said bolt is centrally located, extends through both housing halves and includes said fluid entrance port and an internal fluid transmission passageway for transmitting fluid to be filtered to a position upstream of the filter element.

3. A fluid filter according to claim 2 wherein said securing bolt includes a central, fluid entrance port and a plurality of transverse fluid passageways extending radially outwardly from said central fluid entrance port and communicating with the housing half that is upstream of said filter element.

4. A fluid filter according to claim 3 wherein the rear half of said housing includes a cavity upstream of said filter element for receiving fluid to be cleaned, and a plurality of interconnected pockets positioned around said bolt to provide fluid communication between said cavity and said radial passageways in said bolt.

5. A fluid filter according to claim 1 wherein one of said housing halves are removable for servicing without the need to dismantle fluid connections to said housing.

6. A fluid filter according to claim 1 wherein said front half of said housing includes said fluid exit port downstream of said element and at least one conduit extending across said ribs and grooves to provide fluid communication between said grooves and said exit port.

7. A fluid filter according to claim 1, wherein said front half includes a plurality of spaced, concentric ribs defining grooves therebetween, said ribs supporting said filter element when said element is subject to fluid pressure.

8. The filter of claim 1, wherein the housing has a disc-like configuration and the front and rear halves are generally circular.

9. The filter of claim 1, wherein the fluid exit port is on the same side of the filter housing as the fluid entrance port.

10. A fluid filter comprising:

a housing having front and rear halves;

a filter element detachably secured therein;

means for securing said housing halves together with said filter element secured therebetween;

a fluid entrance port on one side of the housing and internal fluid transmission passageways in the fluid entrance port for transmitting fluid to be filtered to a position upstream of said filter element; and a fluid exit port downstream of said filter element and on the same half of the housing as the fluid entrance port;

wherein said housing has a perimeter seal on said filter element and complementary annular grooves in opposing faces of said halves for receiving and seating said seal.

11. A fluid filter according to claim 10 wherein said filter element is manufactured from a cleanable, re-usable stainless steel and wherein said filter seal is molded to said filter element.

12. A fluid filter according to claim 10 wherein said housing halves include flanges on their peripheries with means for clamping said flanges and thereby securing said housing halves together.

* * * * *